(12) United States Patent
Nakamura

(10) Patent No.: US 9,563,911 B2
(45) Date of Patent: Feb. 7, 2017

(54) AUTOMATIC EVALUATION SYSTEM AND NAVIGATION DEVICE

(71) Applicant: DENSO CORPORATION, Kariya, Aich-pref. (JP)

(72) Inventor: Yuuko Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 42 days.

(21) Appl. No.: 14/436,116

(22) PCT Filed: Sep. 12, 2013

(86) PCT No.: PCT/JP2013/005416
§ 371 (c)(1),
(2) Date: Apr. 16, 2015

(87) PCT Pub. No.: WO2014/064881
PCT Pub. Date: May 1, 2014

(65) Prior Publication Data
US 2015/0287121 A1    Oct. 8, 2015

(30) Foreign Application Priority Data
Oct. 22, 2012   (JP) ................................ 2012-232957

(51) Int. Cl.
*G06Q 30/06*       (2012.01)
*G06F 17/30*       (2006.01)
(Continued)

(52) U.S. Cl.
CPC ........... *G06Q 30/0631* (2013.01); *G01C 21/26* (2013.01); *G06F 17/30* (2013.01); *G06Q 30/0201* (2013.01); *G06Q 30/0205* (2013.01)

(58) Field of Classification Search
CPC . G06Q 30/0205; G06Q 30/0201; G06F 17/30; G01C 21/26
(Continued)

(56) References Cited

U.S. PATENT DOCUMENTS

2011/0022469 A1    1/2011   Fukui et al.

FOREIGN PATENT DOCUMENTS

JP    2009251831 A  *  10/2009
JP    2009251831 A     10/2009
(Continued)

OTHER PUBLICATIONS

Office Action dated Feb. 2, 2016 issued in the corresponding JP application No. 2012-232957 in Japanese with English translation.
(Continued)

*Primary Examiner* — Maceeh Anwari
(74) *Attorney, Agent, or Firm* — Harness, Dickey & Pierce, P.L.C.

(57) ABSTRACT

An automatic evaluation system includes: a navigation device used in a vehicle; and a center that communicates with the navigation device. The navigation device includes: a stop-over determination device that automatically determines whether a user has stopped over at a store; a counting device that counts a cumulative number of stop-over times; a recommended store determination device that determines the store, at which the cumulative number of times has become two, as a recommended store; and a posting device that automatically transmits information on the recommended store to the center. The center includes a registration device that registers the information on the recommended store received from the navigation device in relation with the vehicle as a sender source.

17 Claims, 8 Drawing Sheets

(51) Int. Cl.
*G06Q 30/02* (2012.01)
*G01C 21/26* (2006.01)

(58) Field of Classification Search
USPC .......................................................... 701/537
See application file for complete search history.

(56) References Cited

FOREIGN PATENT DOCUMENTS

| | | | |
|---|---|---|---|
| JP | 2011192181 A | | 9/2011 |
| JP | 2011257370 A | * | 12/2011 |
| JP | 2011257370 A | | 12/2011 |
| WO | WO-2009122498 A1 | | 10/2009 |

OTHER PUBLICATIONS

International Search Report and Written Opinion (in Japanese with English Translation) for PCT/JP2013/005416, mailed Oct. 15, 2013; ISA/JP.

* cited by examiner

AUTOMATIC EVALUATION SYSTEM AND NAVIGATION DEVICE

CROSS REFERENCE TO RELATED APPLICATIONS

This application is a U.S. National Phase Application under 35 U.S.C. 371 of International Application No. PCT/JP2013/005416 filed on Sep. 12, 2013 and published in Japanese as WO 2014/064881 A1 on May 1, 2014. This application is based on and claims the benefit of priority from Japanese Patent Application No. 2012232957 filed on Oct. 22, 2012. The entire disclosures of all of the above applications are incorporated herein by reference.

TECHNICAL FIELD

The present disclosure relates to an automatic evaluation system to automatically perform store evaluation, and a navigation device included in the automatic evaluation system.

BACKGROUND ART

Conventionally, a technique for referring to evaluations from others upon searching for stores such as eating and drinking establishments is known. For example, Patent Literature 1 discloses a technique of, regarding an object facility, calculating the score by user from visiting history information of the user with respect to the facility, and returning the information posted by user(s) having the calculated score equal to or higher than a predetermined value, to the source of a posted information request command.

In the technique disclosed in the Patent Literature 1, when the user presses a virtual button on a screen of his/her cellular phone, visiting history information, including positional information related to a facility, facility information, visiting date and time information, posted information, information on cumulative number of times of visiting, and information on cumulative number of times of posting, is transmitted from the cellular phone to a server, and the visiting history information is registered on the server. Further, the Patent Literature 1 describes that the user-base score is calculated from the number of times of visiting, the number of times of posting, and the latest posting time, and even when the number of times of posting and the latest posting time are the maximum scores, the total score does not become a predetermined value unless the number of times of visiting is at least ten.

However, in the technique disclosed in the Patent Literature 1, it is necessary for the user to press the virtual button on the screen of the cellular phone to make an evaluation to recommend a store, and the operation is troublesome.

On the other hand, it may be arranged such that when the user has stopped over at a store, visiting history information is automatically registered and store is recommended. However, when all the stores at which the user has stopped over are automatically registered and recommended, the number of data is huge, and the credibility of store recommendation is lowered.

PRIOR ART LITERATURES

Patent Literature

Patent Literature 1: JP-2011-192181 A

SUMMARY OF INVENTION

It is an object of the present disclosure to provide an automatic evaluation system and a navigation device for recommendation of a store with high-credibility without user's operation.

According to a first aspect of the present disclosure, an automatic evaluation system includes: a navigation device used in a vehicle; and a center that communicates with the navigation device of at least one vehicle. The navigation device includes: a stop-over determination device that automatically determines based on vehicle status information of the vehicle whether a user has stopped over at a store; a counting device that counts a cumulative number of stop-over times regarding the store, at which the stop-over determination device determines that the user has stopped over; a recommended store determination device that determines the store, at which the cumulative number of times counted with the counting device has become two, as a recommended store; and a posting device that automatically transmits information on the recommended store determined with the recommended store determination device to the center. The center includes a registration device that registers the information on the recommended store received from the navigation device of the at least one vehicle, in relation with the at least one vehicle as a sender source.

Regarding a store which the user has visited twice or more times, since there is a high possibility that the user liked and recommends the store, it is possible to ensure the credibility of evaluation. Further, the determination of the stop-over at the store and the transmission of the information of the recommended store to the center are automatically performed. Accordingly, it is possible to obtain store evaluations from a user who has no time to operate the specialized button for evaluation, and dislikes the labor of this operation and does not make a store evaluation. Accordingly, it is possible to reduce the rate of store evaluations by false customers who may be included in the users willing to do the above-described labor to make store evaluations, and it is possible to increase the credibility of store evaluation. Therefore, according to the above-described evaluation system, it is possible to recommend a store with high credibility without any operation by a user.

According to a second aspect of the present disclosure, an automatic evaluation system includes: a navigation device used in a vehicle; and a center that communicates with the navigation device of at least one vehicle. At least one of the center and the navigation device includes: a stop-over determination device that automatically determines whether a user has stopped over at a store, based on vehicle status information of the vehicle; a counting device that counts a cumulative number of stop-over times with regard to the store determined with the stop-over determination device as the store, at which the user has stopped over; a recommended store determination device that determines the store, at which the cumulative number of times counted with the counting device has become n, as a recommended store; a registration device that automatically registers the recommended store determined with the recommended store determination device; and a display device that displays information on the recommended store registered in the registration device. N is an integer equal to or greater than 2.

According to the above-described automatic evaluation system, it is possible to recommend a store with high credibility without any operation by a user.

According to a third aspect of the present disclosure, a navigation device used in the automatic evaluation system described in the first aspect or the second aspect.

In the above-described navigation device, is possible to recommend a store with high credibility without any operation by a user.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinbelow, embodiments of the present disclosure will be described using the drawings.

(Embodiment 1)

Figure 1:
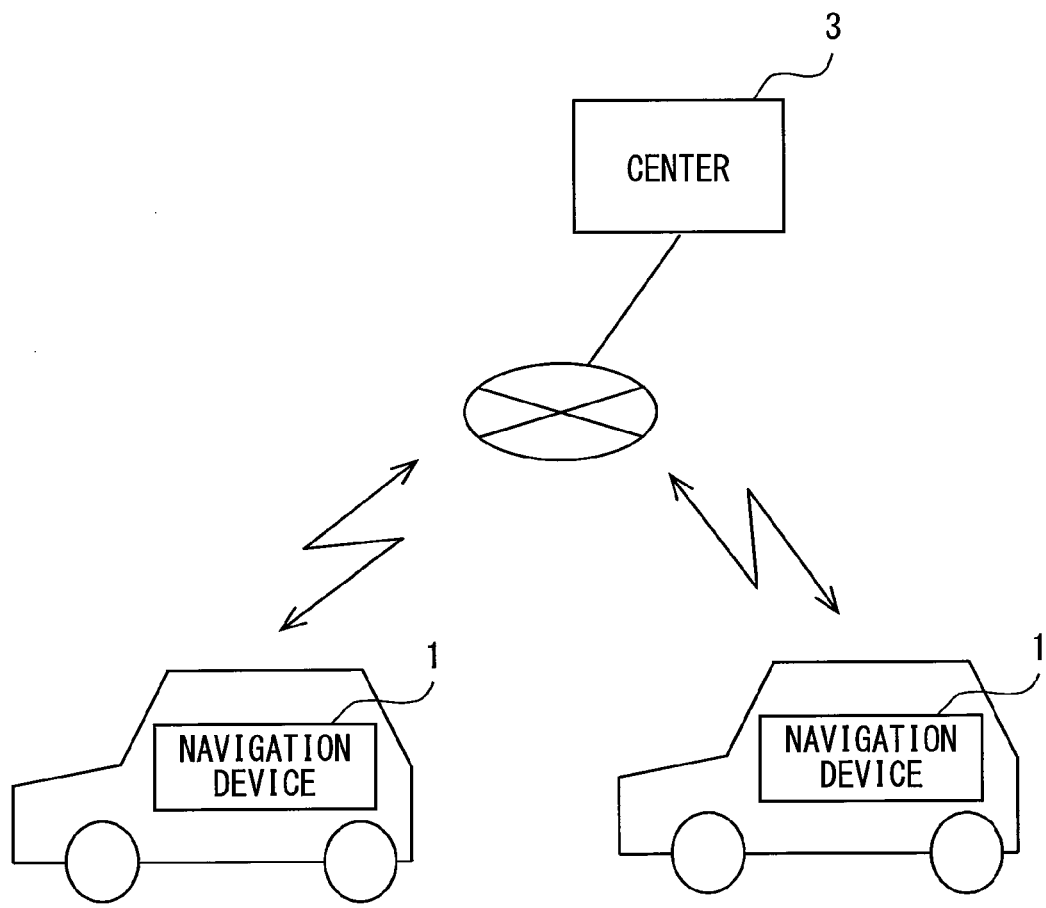
FIG. 1 is a block diagram showing an example of a schematic configuration of an automatic evaluation system.

FIG. 1 is a block diagram showing an example of a schematic configuration of an automatic evaluation system 100 to which the present disclosure is applied. The automatic evaluation system 100 shown in FIG. 1 has a navigation device 1 and a center 3.

The navigation device 1 has a check-in function and a posting function to be described later in addition to publicly-known navigation functions such as route search and railway guidance. Then the schematic configuration of the navigation device 1 will be described using FIG. 2.

Figure 2:
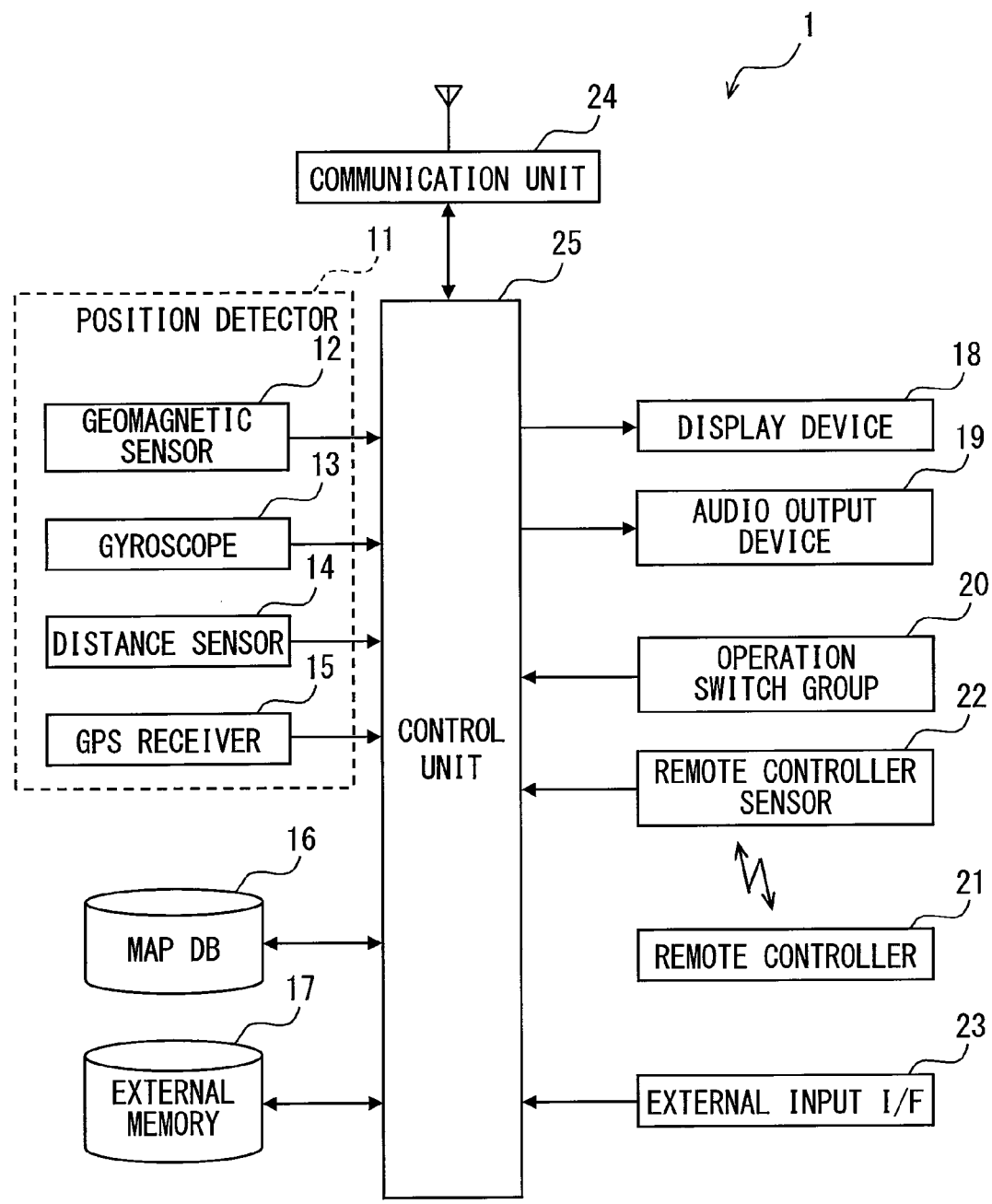
FIG. 2 is a block diagram showing an example of a schematic configuration of a navigation device.

As shown in FIG. 2, the navigation device 1 has a position detector 11, a map database (DB) 16, an external memory 17, a display device 18, an audio output device 19, an operation switch group 20, a remote control terminal (remote controller) 21, a remote controller sensor 22, an external input interface (I/F) 23, a communication unit 24, and a control unit 25.

The position detector 11 has a geomagnetic sensor 12, a gyroscope 13, a vehicle speed (distance) sensor 14 to calculate a travel distance, all of which are publicly known, and a GPS (Global Positioning System) receiver 15 to detect a vehicle position based on a radio wave from a satellite, and sequentially detects a current position and a travelling direction of the own vehicle. For example, the own vehicle current position (hereinbelow, own vehicle position) corresponds with coordinates expressed with latitude and longitude, and the own vehicle travelling direction, with an azimuth angle, with north as a reference direction.

Since these elements have errors of respectively different properties, they are used while respectively being complemented with a plurality of sensors. Note that the position detector 11 may be formed with a part of the above-described elements in accordance with accuracy of the respective sensors.

The map DB 16 holds road map data, POI (Points Of Interest) data of various facilities, and the like. The road map data has road data including node data and link data, background data indicating topographic features and the like, character data to display geographic names and the like. The POI data is data indicating name and address, position and attribute of a facility.

The position data of the POI data corresponds to e.g. coordinates expressed with latitude and longitude. Further, the attribute data of the POI data represents type and property of the POI data. As an example of the types of the POI data, as to a store, a restaurant, a cafe, a Japanese-style bar, a convenience store, a drug store, and the like, are given. Further, as facilities other than the store, coin operated parking space, a hospital and the like are given. As an example of the properties of the POI data, a store to which a single user visits or a store to which a plurality of users visit, and the like, are given. Accordingly, the map DB 16 corresponds to the store information storage device.

It may be arranged such that the data of the map DB 16 is downloaded with the control unit 25 through an unshown communication I/F from a network such as the Internet, or it is previously stored. As the map DB 16, a storage medium such as a CD-ROM, a DVD-ROM, a memory card, an HDD or the like, may be used.

The external memory 17 is a large capacity storage device such as a writable HDD. A large amount of data, data not to be deleted when the power source is turned off, and the like, are stored in the external memory 17, otherwise, frequently-used data is duplicated from the map DB 16 and utilized. Note that the external memory 17 may be a removable memory having a comparatively small capacity.

The display device 18 displays a map to guide travelling of the vehicle, a destination selection screen and the like. It is capable of e.g. full-color display. It is formed using a liquid crystal display, an organic EL display, a plasma display, or the like. Further, the audio output device 19, formed with a speaker or the like, outputs voice guidance upon route guidance or the like based on an instruction from the control unit 25.

The operation switch group 20, in which a touch switch integrated with e.g. the display device 18, a mechanical switch and the like are used, performs operation instruction of the various functions to the control unit 25 with a switch operation.

The remote controller 21 is provided with a plurality of operation switches (not shown). It is possible to perform the same functions as those of the operation switch group 20 with the control unit 25 by inputting various command signals via the remote controller sensor 22 into the control unit 25 by switch operation.

The external input I/F 23 is an interface for the control unit 25 to obtain the vehicle status information from an ECU and sensors mounted in the own vehicle. For example, the vehicle status information is inputted from the ECU and the sensors mounted in the own vehicle via a vehicle LAN or the like in conformity with a communication protocol such as CAN (controller area network) into the external input I/F 23.

As an example of the vehicle status information, a signal from a shift position sensor, an ON/OFF signal of a parking brake switch, an ON/OFF signal of a door courtesy switch, an ON/OFF signal of an ignition power source, a signal from a seating sensor of an assistant driver's seat, and the like, are given.

The communication unit 24 performs communication with the center 3 via a base station and the network. It may be arranged such that the communication unit 24 communicates with the center 3 through e.g. an on-vehicle communication module used for telematics communication such as DCM (data communication module) mounted in a vehicle. Further, it may be arranged such that the communication unit 24 performs communication with the center 3 through a DSRC communication module, or through a personal digital assistance connected with Bluetooth (registered trademark) or the like.

The control unit 25 has a microcomputer including a CPU, a ROM, a RAM, a backup RAM, and the like, as a main body. The control unit 25 performs processing as navigation functions such as route search and route guidance, processing as a check-in function (hereinbelow, check-in processing) and processing as a posting function (hereinbelow, posting processing), based on various information inputted from the position detector 11, the map DB 16, the external memory 17, the operation switch group 20, the remote controller sensor 22, the external input I/F 23, and the communication unit 24.

Note that the navigation device 1 is not limited to the on-vehicle navigation device. For example, it may be a cellular phone having navigation functions which can be brought into the vehicle and used there, or a personal digital assistance such as a tablet PC. When the personal digital assistance is used as the navigation device 1, it may be arranged such as the information is obtained from the ECU and the like of the vehicle by publicly-known radio communication such as Bluetooth (registered trademark), or by cable communication.

Figure 3:
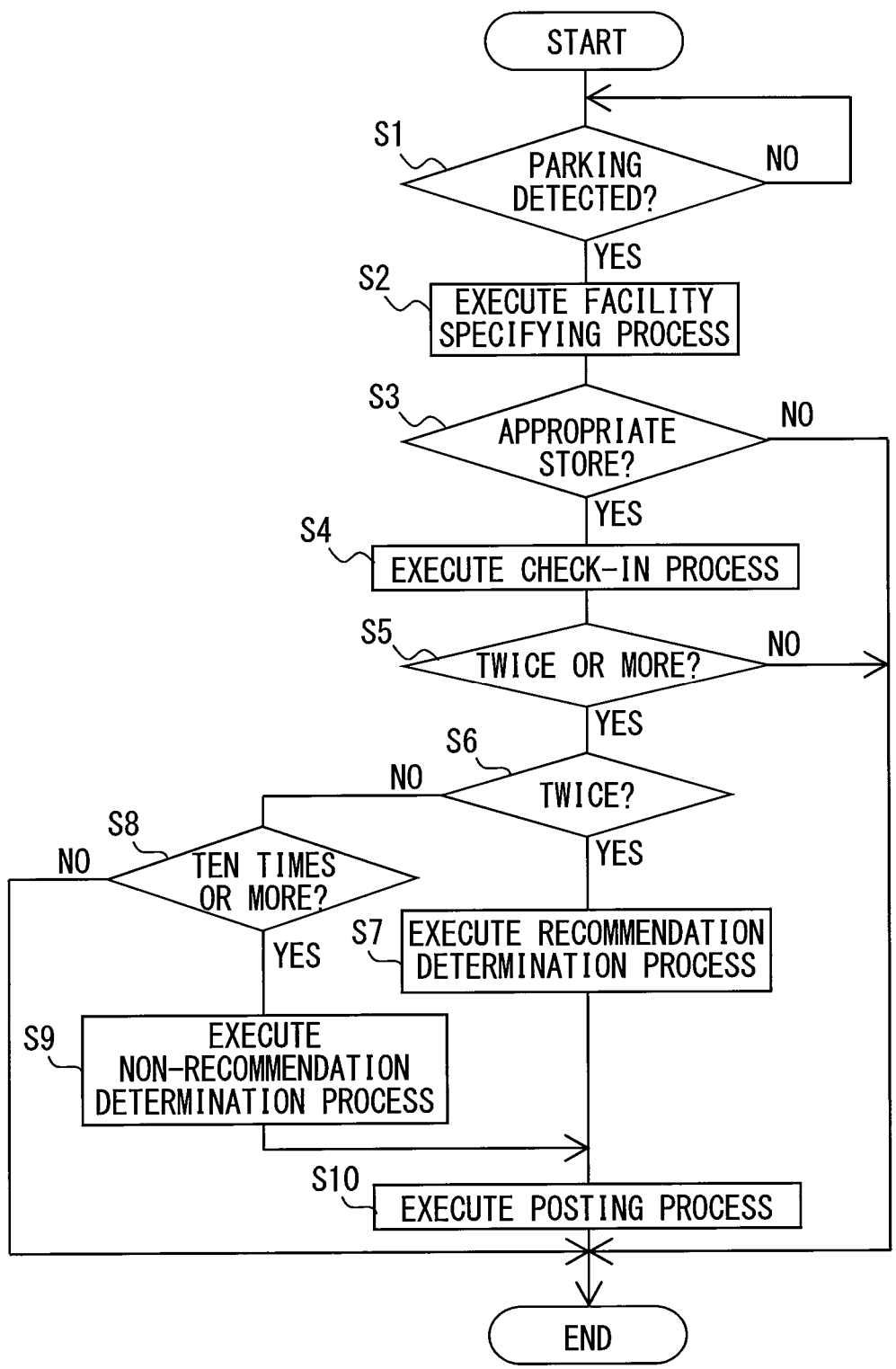
FIG. 3 is a flowchart showing an example of a flow of processing related to check-in processing and posting processing in a control unit.

Next, a flow of processing related to the check-in processing and the posting processing in the control unit 25 will be described using the flowchart of FIG. 3. The flow in FIG. 3 is started every time the ignition power source of the own vehicle is turned ON.

At step S1, it is inferred that the user has stopped over at a facility by detecting parking of the own vehicle. The parking of the own vehicle is detected in accordance with turning OFF of the ignition power source, turning ON of the parking brake, change of the shift position to parking position (P), and opening of the door, and the like.

The turning OFF of the ignition power source is detected from the ON/OFF signal of the ignition power source, and the turning ON of the parking brake, from the ON/OFF signal of the parking brake switch. Further, the change of the shift position to the parking position (P) is detected from the signal from the shift position sensor, and the opening of the door, from the ON/OFF signal of the door courtesy switch.

At step S1, when it is detected that the own vehicle has been parked (YES at step S1), the process proceeds to step S2. On the other hand, when it is not detected that the own vehicle has been parked (NO at step S1), the process returns to step S1 to repeat the flow.

At step S2, facility specifying processing is performed, and the process proceeds to step S3. In the facility specifying processing, the facility corresponding to the position in which the parking of the own vehicle has been detected (hereinbelow, parking detection position) is specified based on the POI position data stored in the map DB 16. The parking detection position is obtained from the position detector 11. Further, as an example of the method of specifying the facility corresponding to the parking detection position, the POI position data specifies a facility closest to the parking detection position.

At step S3, it is determined whether or not the facility (hereinbelow, specified facility) specified in the facility specifying processing is a store (hereinbelow, appropriate store) of a type corresponding to the object of check-in processing. That is, it is automatically determined whether or not the user has stopped over at the store as the appropriate store by the processing at steps S1 to step S3 based on the vehicle status information of the vehicle. Accordingly, the processing at steps S1 to step S3 corresponds to the stop-over determination device.

The types of the appropriate store are stored in the nonvolatile memory of the control unit 25. The control unit 25 determines whether or not the specified facility is the appropriate store based on whether or not the type of the specified facility corresponds to the type of the previously stored appropriate store. The type of the specified facility is specified based on the POI attribute data.

As an example of the types of the previously stored appropriate stores, eating and drinking establishments such as a restaurant, a cafe, and a Japanese-style bar, a variety store, an amusement store and the like are given. As an example of the types of facilities excluded from store, a facility other than stores such as coin operated parking space, a hospital, a store with high tendency of non-recommendation or high probability of chance stop over, and the like are given. As an example of the stores excluded from the appropriate store, a convenience store, a drug store, a karaoke bar, an apparel shop, and the like are given.

At step S3, when it is determined that the specified facility is the appropriate store (YES at step S3), the process proceeds to step S4. On the other hand, when it is determined that the specified facility is not the appropriate store (NO at step S3), the flow ends.

At step S4, the check-in processing is performed, and the process proceeds to step S5. In the check-in processing, regarding the specified facility determined as the appropriate store at step S3 (hereinbelow, stop over store), the cumulative number of stop-over times is counted. Accordingly, the processing at step S4 corresponds to the counting device.

The cumulative number of times is stored in the nonvolatile memory of the control unit 25 by store, and it is not deleted even when the ignition power source is turned OFF, and is updated each time counting is performed with respect to the same store. As an example, upon each counting, a time stamp indicating the date and time of counting is attached to the cumulative number of times by store. Further, the time stamp is sequentially deleted except the time stamps regarding countings within a predetermined number of times from the latest counting.

At step S5, when the cumulative number of stop-over times at the above-described store is equal to or more than two (YES at step S5), the process proceeds to step S6. On the other hand, when the cumulative number of stop-over times is one (NO at step S5), the flow ends.

At step S6, when the cumulative number of stop-over times at the above-described stop over store is two (YES at step S6), the process proceeds to step S7. On the other hand, when the cumulative number of stop-over times is not two (NO at step S6), the process proceeds to step S8.

At step S7, recommendation determination processing is performed, and the process proceeds to step S10. In the recommendation determination processing, it is determined that the above-described stop over store at which the cumulative number of stop-over times is two, is a store recommended by the user of the navigation device 1 (hereinbelow, recommended store). Accordingly, the processing at step S7 corresponds to the recommended store determination device.

Regarding a store which a user visits for not only once but twice, there is a high possibility that the user liked the store and it is a recommended store. According to the present embodiment, it is possible to ensure the credibility of evaluation while performing the store evaluation in a short period. The tendency that the store which the user visits for the second time is a recommended store is high especially among female users. Accordingly, for the female users, the navigation device 1 according to the present embodiment is preferable.

When the cumulative number of times is not twice at step S6, it is determined at step S8 whether or not the cumulative number of stop-over times within a predetermined period is equal to or more than a predetermined number of times. The cumulative number of stop-over times within the predetermined period is calculated based on the time stamp attached by each counting.

Further, the predetermined number of times here is an optional number of times more than twice, and is a value set for the purpose of excluding stores which the user frequently visits within the predetermined period such as the user's workplace. In the present embodiment, as an example, it is determined whether or not the cumulative number of times counted within two weeks is equal to or more than ten, and the subsequent explanation will be continued.

When it is determined that the cumulative number of stop-over times within two weeks is equal to or more than ten (YES at step S8), the process proceeds to step S9. On the other hand, when it is determined that the cumulative number of stop-over times within two weeks is less than ten, (NO at step S8), the flow ends.

At step S9, non-recommendation determination processing is performed, and the process proceeds to step S10. In the non-recommendation determination processing at step S9, it is determined that the above-described stop over store, at which the cumulative number of stop-over times within two weeks is equal to more than ten, is a store not recommended by the user of the navigation device 1 (hereinbelow, not-recommended store). Accordingly, the processing at step S9 corresponds to the second not-recommended store determination device.

At step S10, the posting processing is performed, and the flow ends. In the posting processing, when the recommended store determination has been performed in the determination processing, the recommended store information is automatically transmitted from the communication unit 24 to the center 3. Further, when the not-recommended store determination has been performed in the non-recommendation determination processing, the not-recommended store information is automatically transmitted via the communication unit 24 to the center 3. Accordingly, the processing at step S10 corresponds to the posting device.

The recommended store information is, e.g. information indicative of a recommended store, position coordinates of the store, a store name, a store address, and the like. The not-recommended store information is, e.g. information indicative of a not-recommended store, position coordinates of the store, a store name, a store address, and the like. The information on the position coordinates of the store, the store name and the store address are obtained from the POI data stored in the map DB 16.

Further, in the posting processing, in correspondence with e.g. the recommended store information, identification information to specify the user as a sender source of the recommended store information and category specifying information to specify the category of the user are transmitted via the communication unit 24 to the center 3.

The identification information may be a vehicle ID of the own vehicle, or may be a device ID of the navigation device 1. Assuming a case where the navigation device 1 is a portable device with a GPS function such as a personal digital assistance and the user brings it in another vehicle, it is more preferable that the identification information is the device ID of the navigation device 1.

The category specifying information includes, e.g., information on a car type of the vehicle which the user rides in, the user's favorite music genre, a model of the user's personal digital assistance, the user's living area, friends and acquaintances of the user, and the like.

The information on the car type is obtained from the ECU or the like of the own vehicle. The information on the favorite music genre is obtained by specifying a genre regarding which the number of play times is the maximum from play history in a car audio of the own vehicle, the user's portable audio player or personal digital assistance. The information on the model of the personal digital assistance is obtained from the personal digital assistance used by the user.

The information on the living area is obtained by specifying an area to which the user has travelled a predetermined or large number of times from the travelling history of the own vehicle and using the area as the living area. Further, it is obtained by determining an administrative district such as a city, a town, a village, or a ward where the user's house is positioned, as the living area. Otherwise it is obtained by determining a range within a predetermined distance from the user's house as the living area. When the navigation device 1 is an on-vehicle navigation device, the information on the own-device is utilized as the information on the user's house and the travelling history. Further, when the navigation device 1 is a personal digital assistance, the information on the user's house registered in the own-device is utilized.

The information on the friends and acquaintances is obtained by obtaining addresses and telephone numbers of friends and acquaintances from an address book of the personal digital assistance used by the user. Otherwise the addresses and telephone numbers of the friends and acquaintances are obtained by utilizing a social network service of the user's personal digital assistance. When the information on the friends and acquaintances is transmitted as the category specifying information to the center 3, the user's own address and telephone number are transmitted with information indicating that the address is the user's own address.

When the navigation device 1 is an on-vehicle navigation device and the information in the portable audio player or personal digital assistance is obtained, the information is obtained while the own-device is performing radio communication by Bluetooth or cable communication by USB connection with the portable audio player or personal digital assistance. Further, when the navigation device 1 is a personal digital assistance and the information in the personal digital assistance is obtained, the information on the own-device is utilized.

Note that in the present embodiment, when the cumulative number of stop-over times at the same store is two, the recommendation determination processing is performed, however, the present disclosure is not limited to this arrangement. For example, it may be arranged such that when it is inferred with the control unit 25 that the stop-over at the store has periodicity since the second visit has been counted on the same day of week as the day on which the previous count was made, or the second visit has been counted in the same time zone as that in which the previous count was made, the recommendation determination processing is not performed, or it is determined that the store is a not-recommended store. According to this arrangement, it is possible to exclude a store at which the user periodically stops over, such as a store where the user works as a part timer, from the stores recommended by the user, and it is possible to further improve the credibility of the store evaluation.

Further, it may be arranged such that when the second visit has been counted within a predetermined period since the previous counting was performed, e.g., the second visit has been counted within a week since the previous counting was performed, the recommendation determination processing is not performed, or it is determined that the store is a not-recommended store. It may be arranged such that the predetermined period here is a value which can be optionally set, and it is previously set by store type.

Figure 4:
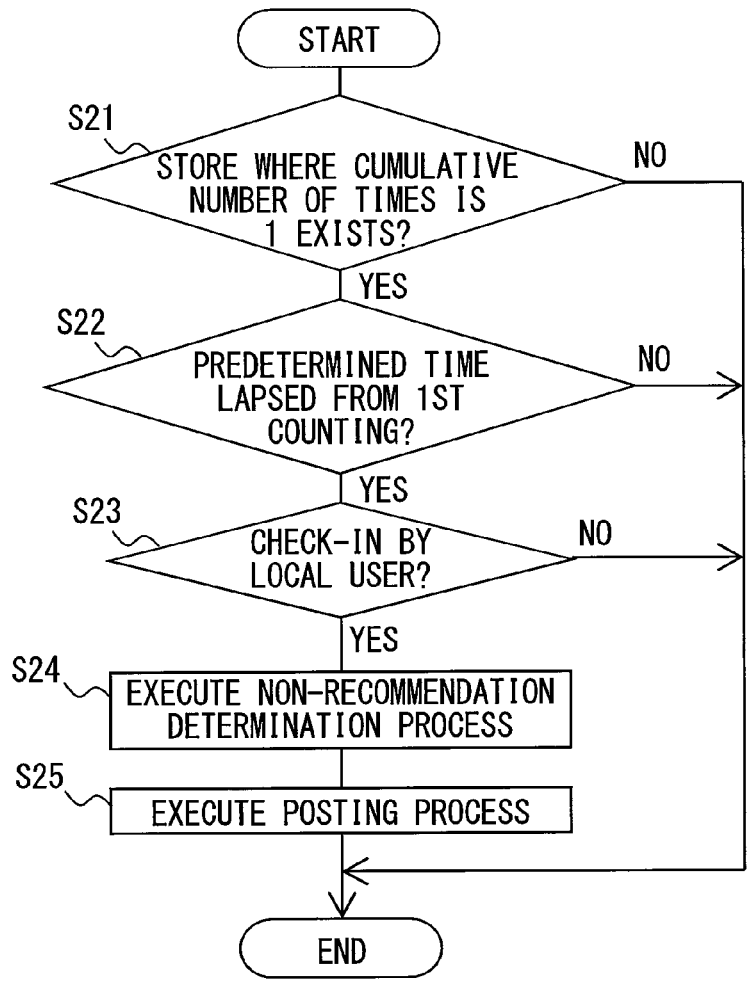
FIG. 4 is a flowchart showing an example of a flow of non-recommendation determination processing in the control unit regarding a store at which a cumulative number of stop-over times is one.

Next, the non-recommendation determination processing with the control unit 25 with respect to a store at which the cumulative number of stop-over times is one will be described using the flowchart of FIG. 4. The flow in FIG. 4, independently of the flow in FIG. 3, starts every time when e.g. the ignition power source of the own vehicle is turned ON. Further, it may be arranged such that the processing of the flow in FIG. 4 is performed in FIG. 3 prior to the processing at step S4.

First, at step S21, it is determined whether or not a store at which the cumulative number of times is one exists among the stores regarding which the cumulative number of stop-over times is stored. When a store at which the cumulative number of times is one exists (YES at step S21), the process proceeds to step S22. On the other hand, when a store at which the cumulative number of times is one does not exist (NO at step S21), the flow ends.

At step S22, regarding the store at which the cumulative number of stop-over times is one, it is determined whether or not a predetermined or longer period has elapsed since the first counting was performed. The period since the first counting was performed is calculated from the time stamp attached upon the first counting and the current date and time.

The predetermined period here is a value which can be optionally set, and is a value preferably set in consideration of general frequency of use which differs in accordance with store type. For example, regarding a store where the general frequency of use is several-day unit, the predetermined period is set at several weeks. Regarding a store where the general frequency of use is weekly unit, the predetermined period is set at one month.

Further, as an example of particular arrangement, the correspondence between store type and period value is previously stored in the nonvolatile memory of the control unit 25, and the control unit 25 refers to the correspondence and sets a period corresponding to the store type. Accordingly, the control unit 25 corresponds to the correspondence storage device.

Then, at step S22, when it is determined that a predetermined or longer period has elapsed since the first counting was performed, (YES at step S22), the process proceeds to step S23. On the other hand, when it is determined that the predetermined or longer period has not elapsed since the first counting was performed (NO at step S22), the flow ends.

At step S23, it is determined whether or not check-in has been made by a local user. As an example, based on the position data of the store at which the counting has been performed and the information on the living area of the above-described user, when it is determined that the position of the store at which the counting has been performed is within the living area of the user, it is determined that the check-in has been made by a local user. Further, when the position of the store at which the counting has been performed is out of the living area of the user, it is determined that the check-in has not been performed by a local user. Accordingly, the processing at step S23 corresponds to the internal/external determination device.

When it is determined that the check-in has been made by a local user (YES at step S23), the process proceeds to step S24. Further, when it is determined that the check-in has not been made by a local user (NO at step S23), the flow ends.

At step S24, the non-recommendation determination processing is performed, and the process proceeds to step S25. In the non-recommendation determination processing at step S24, the store where a predetermined or longer period has elapsed since the first counting was performed and check-in has been performed by a local user, is determined as a not-recommended store. Accordingly, the processing at step S24 corresponds to the first not-recommended store determination device.

It is conceivable that a user, who is not a local user but is a tourist or the like, cannot visit even a store he/she liked again, or requires the above-described predetermined or longer period before the user visits the store again. In this case, when the store at which the predetermined or longer period has elapsed since the first counting was performed is determined as a not-recommended store, the store which the user liked may be determined as a not-recommended store. On the other hand, according to the above-described arrangement, even regarding a store at which a predetermined or longer period has elapsed since the first counting was performed, when it is determined that the check-in has not been made by a local user, the store is not determined as a not-recommended store. Accordingly, it is possible to further improve the credibility of store evaluation.

Note that it may be arranged such that the processing at step S23 is omitted, and in the non-recommendation determination processing step S24, the store at which the predetermined or longer period has elapsed since the first counting was performed is determined as a not-recommended store. In this case, it is possible to determine a store, which the user has not visited again for a predetermined or longer period and the possibility that the user did not like the store is comparatively high, as a not-recommended store, so as not to provide guidance of the store with a high possibility that the user did not like to the user.

At step S25, the posting processing is performed, and the flow ends. In the posting processing at step S25, as in the case of the posting processing at the above-described step S10, the information on the above-described not-recommended store regarding the store determined at step S24 as a not-recommended store is linked to the identification information and category specifying information, and transmitted from the communication unit 24 to the center 3.

Note that it may be arranged such that regarding the store determined as a not-recommended store in the non-recommendation determination processing at step S9 and the non-recommendation determination processing at step S24, it is determined that the store is not an appropriate store in the processing at step S3, and the store is not determined as a recommended store in the recommendation determination processing at step S7. In this case, the store determined as a not-recommended store is registered as a not-recommended store in the nonvolatile memory of the control unit 25.

Figure 5:
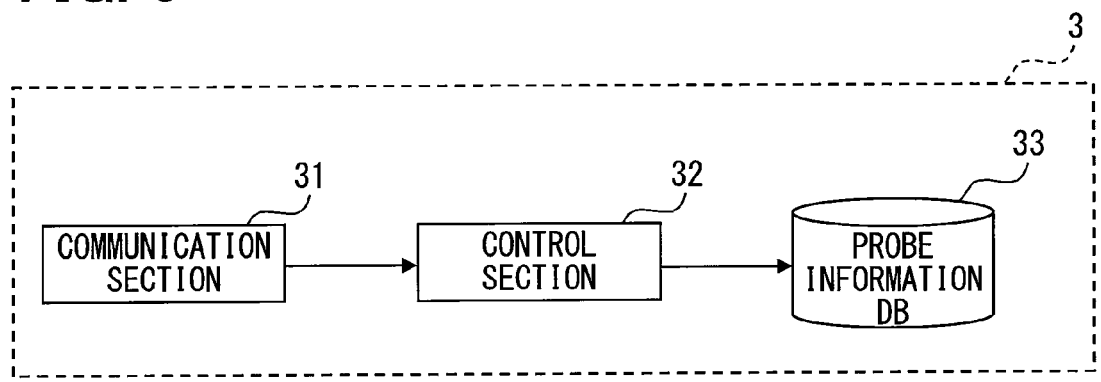
FIG. 5 is a block diagram showing an example of a schematic configuration of a center.

Returning to FIG. 1, the center 3 is a base station fixed on e.g. the ground, having a server. Next, a schematic configuration of the center 3 will be described using FIG. 5. The center 3 has a communication section 31, a control section 32, and a probe information database (hereinbelow, probe information DB) 33. Note that the center 3 may be formed with one server, or with a plurality of servers.

The communication section 31 receives recommended store information or not-recommended store information transmitted from the navigation device 1, identification information and category specifying information, and inputs the information into the control section 32. Further, the communication section 31 transmits the recommended store information to the navigation device 1 in accordance with an instruction from the control section 32.

The control section 32 is formed with a microcomputer having a CPU, a ROM, a RAM, a backup RAM, and the like, as a main body. The control section 32 performs various pieces of processing related to the distribution processing based on various information inputted from the communication section 31 and the probe information DB 33.

The control section 32 registers the recommended store information or the not-recommended store information and the category specifying information into the probe information DB 33, based on the recommended store information or the not-recommended store information, the identification information and the category specifying information (hereinbelow, probe information) received with the communication section 31, by user indicated with the identification information. Accordingly, the control section 32 corresponds to the registration device.

For example, when the not-recommended store information is received with the communication section 31, the not-recommended store information and the category specifying information are registered when stored in a storage area allocated to the user indicated with the identification information. Further, when the recommended store information is received with the communication section 31, a storage area is allocated to the user indicated with the identification information, then the recommended store information and the category specifying information are registered when stored in the storage area. The user indicated with the identification information corresponds to the sender source of the recommended store information or the sender source of the not-recommended store information.

Figure 6:
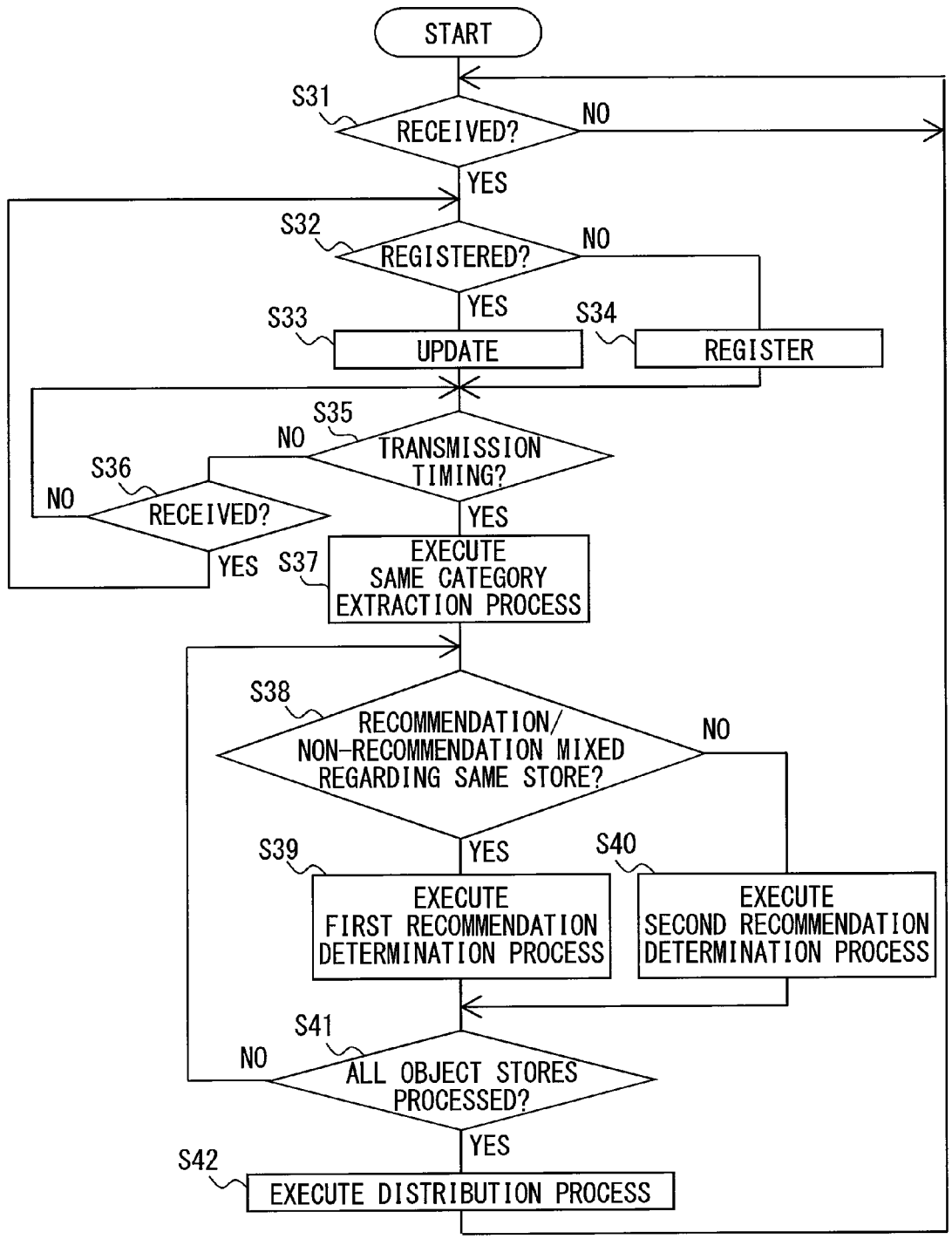
FIG. 6 is a flowchart showing an example of a flow of processing related to distribution processing in the center in an embodiment 1.

Next, the flow of processing related to the distribution processing in the control section 32 will be described using the flowchart of FIG. 6. The flow in FIG. 6 is started when e.g. the power source of the server in the center 3 is turned ON.

First, at step S31, it is determined whether or not probe information has been received from the navigation device 1. The reception of probe information from the navigation device 1 is determined by reception of input of the probe information received in the communication section 31. When it is determined that the probe information has been received (YES at step S31), the process proceeds to step S32. On the other hand, when it is determined that the probe information has not been received, (NO at step S31), the flow at step S31 is repeated.

At step S32, based on the identification information and the recommended store information or the not-recommended store information in the probe information, it is determined whether or not the information, which is information on the user indicated with the identification information and in which the store indicated with the recommended store information or the not-recommended store information is the same, has already been registered in the probe information DB 33. When it is determined that the information has already been registered (YES at step S32), the process proceeds to step S33. On the other hand, when it is determined that the information has not been registered (NO at step S32), the process proceeds to step S34.

At step S33, the recommended store information or the not-recommended store information and the category specifying information regarding the registered store are updated by overwriting with the newly received recommended store information or the not-recommended store information and the category specifying information, and the process proceeds to step S35.

For example, in a case where the not-recommended store information has been registered as a result of the non-recommendation determination processing at the above-described step S24, when the recommended store information regarding the same store is transmitted as a result of the recommendation determination processing at the above-described step S7, the not-recommended store information is updated with the recommended store information. Further, in a case where the recommended store information has been registered as a result of the recommendation determination processing at the above-described step S7, when the not-recommended store information regarding the same store is transmitted as a result of the non-recommendation determination processing at the above-described step S9, the recommended store information is updated with the not-recommended store information.

Further, at step S34, the received recommended store information or the not-recommended store information and the category specifying information are registered when stored in a storage area of the probe information DB 33 allocated to the user indicated with the received identification information, and the process proceeds to step S35.

At step S35, it is determined whether or not it is distribution timing. For example, it is determined that it is the distribution timing when the information distribution request is received from the navigation device 1 via the communication section 31. Assuming that the information distribution request includes e.g. the above-described identification information on the sender source, the explanation will be continued below.

It may be arranged such that the information distribution request from the navigation device 1 is performed with, e.g. turning ON of the ignition power source of the vehicle using the navigation device 1 as a trigger, or with execution of destination setting or route search with the navigation device 1 as a trigger.

At step S35, when it is determined that it is the distribution timing (YES at step S35), the process proceeds to step S37. On the other hand, when it is determined that it is not the distribution timing (NO at step S35), the process proceeds to step S36.

At step S36, it is determined whether or not the probe information has been received from the navigation device 1. When it is determined that the probe information has been received (YES at step S36), the process returns to step S32 to repeat the flow. On the other hand, when it is determined that the probe information has not been received (NO at step S36), the process returns to step S35 to repeat the flow.

When it is determined at step S35 that it is the distribution timing, same category extraction processing is performed at step S37 and the process proceeds to step S38. In the same category extraction processing, information on a store recommended by a user belonging to the same category as that of the user of interest is extracted from the probe information DB 33 except the information on the store recommended by the user of the navigation device 1 as the sender source of the information distribution request. As an example, the processing is realized with the following arrangement.

First, based on the identification information included in the information distribution request, the category specifying information of the user of the navigation device 1 as the sender source of the information distribution request is read from the probe information DB 33. Then, information on a recommended store, linked to category specifying information belonging to the same category specified with the read category specifying information, is extracted from the probe information DB 33.

For example, when the category specifying information is information on a car type, a favorite music genre, or a model of a personal digital assistance, it is determined that the information belongs to the same category when the category specifying information is information on the same car type, music genre, or model of personal digital assistance. When the category specifying information is information on a living area, it is determined that the information belongs to the same category when the living areas overlap by a predetermined or higher percentage. Further, it is determined that the information belongs to the same category when the living areas correspond with each other. Further, when the category specifying information is information on friends and acquaintances, it is determined that the information belongs to the same category when the address, the telephone number and the like of the user of the navigation device 1 as the sender source of the information distribution request are included.

According to this arrangement, it is possible to perform the subsequent first recommendation determination processing and second recommendation determination processing, restrictly with respect to recommended store information and not-recommended store information transmitted from the navigation device 1 of which the user belongs to the same category as that of the user as the sender source of the information distribution request, and probably has similar preference as the user as the sender source of the information distribution request. Accordingly, it is possible to distribute the recommended store information which matches the preference of the user as the sender source of the information distribution request with higher possibility, to the navigation device 1 and provide guidance to the user.

Further, it may be arranged such that in the same category extraction processing, when the category specifying information has a plurality of types of information such as the information on friends and acquaintances and the information on living area, recommended store information by a user belonging to the same category of at least one of the plurality of types of information is extracted.

Further, it may be arranged such that when the category specifying information has a plurality of types of information, priority is set by type, and extraction of recommended store information by a user belonging to the same category is sequentially performed from the highest priority type, and the extraction is terminated when the number of extractions of the highest priority type of information becomes a certain number. For example, since it is considered that there is a high possibility that the preference of friends and acquaintances>living area>music genre, car type, model of personal digital assistance, are similar to that of the user when belonging to the same category, the priority order is made in accordance with this order.

At step S38, regarding the same store, it is determined whether or not recommended store information and not-recommended store information mixedly exist in the probe information DB 33, in the information extracted in the same category extraction processing. The case where recommended store information and not-recommended store information mixedly exist in the probe information DB 33 is a case where even regarding the same store, recommended store information is registered by one user, and not-recommended store information is registered by another user.

When it is determined that the recommended store information and the not-recommended store information mixedly exist (YES at step S38), the process proceeds to step S39. On the other hand, when it is determined that the recommended store information and the not-recommended store information do not mixedly exist (NO at step S38), the process proceeds to step S40. The processing at step S38 is performed on e.g., all the stores included in the information extracted in the same category extraction processing, sequentially by one store.

At step S39, the first recommendation determination processing is performed and the process proceeds to step S41. In the first recommendation determination processing, based on the recommended store information and the not-recommended store information regarding the same store, in the information extracted in the same category extraction processing, it is determined whether or not the store is a recommended store or a not-recommended store. Accordingly, this step S39 corresponds to the recommendation determination device.

As an example, in the first recommendation determination processing, in the information extracted in the same category extraction processing, when the ratio of the number of registrations of not-recommended store information to the total number of registrations of the recommended store information and the not-recommended store information regarding the same store is equal to or greater than a predetermined value, the store is determined as a not-recommended store. On the other hand, when the ratio of the number of registrations of the not-recommended store information to the total number of registrations is less than a predetermined value, the store is determined as a recommended store.

Note that it may be arranged such that when at least one piece of recommended store information exists in the information registered by sender source regarding the same store, the store is determined as a recommended store (hereinbelow, modification 1). Further, it may be arranged such that when at least one piece of not-recommended store information exists in the information registered by sender source regarding the same store, the store is determined as a not-recommended store (hereinbelow, a modification 2).

At step S40, the second recommendation determination processing is performed, and the process proceeds to step S41. In the second recommendation determination processing, when all the information registered by sender source regarding the same store is the recommended store information in the information extracted in the same category extraction processing, the store is determined as a recommended store. On the other hand, when all the information registered by sender source regarding the same store is not-recommended store information in the information extracted in the same category extraction processing, the store is determined as a not-recommended store.

At step S41, regarding all the stores included in the information extracted in the same category extraction processing, i.e., regarding all the object stores, when the processing at step S38 and S39 or step S40 has been completed (YES at step S41), the process proceeds to step S42. On the other hand, when the processing on all the stores has not been completed, the process returns to step S38, to repeat the processing on an unprocessed store.

At step S42, the distribution processing is performed, and the process returns to step S31, to repeat the flow. In the distribution processing, recommended store information on the store, determined as a recommended store in the first recommendation determination processing and the second recommendation determination processing, is distributed via the communication section 31 to the navigation device 1 of the sender source of the information distribution request. Accordingly, step S42 corresponds to the distribution device. The recommended store information distributed by the distribution processing is e.g. information indicative of a recommended store and the position coordinates of the store. Further, the name of the store, the address of the store and the like may be included.

In the present embodiment, it is determined that it is distribution timing when the information distribution request is received from the navigation device 1, however, the present disclosure is not limited to this arrangement. For example, it may be arranged such that the control section 32 determines that it is distribution timing by predetermined period such as one hour or one day. In this case, the processing at step S38 to step S42 is performed by the navigation device 1 as a distribution destination.

Returning to FIG. 1, the control unit 25 of the navigation device 1 receives distribution of the recommended store information, and performs the recommended store guidance processing based on the distributed recommended store information. Accordingly, the control unit 25 corresponds to the guidance device.

As an example of the recommended store guidance processing, upon route guidance, a mark such as an arrow or triangle indicating a recommended store is overlay-displayed on a facility corresponding to the recommended store on an electronic map displayed on the display device 18, or the facility corresponding to the recommended store is surrounded with a frame in the display.

Further, as an example of the recommended store guidance processing, it may be arranged such that a list of recommended stores is displayed on the display device 18, or recommended stores are displayed on the display device 18 as candidates of a destination upon destination search. For example, in the destination search, when the user selects genre search "eat and drink", eating and drinking establishments among the recommended stores are displayed as candidates on the display device 18.

Further, it may be arranged such that, by attaching a time stamp upon latest recommendation determination with respect to a recommended store to the recommended store information distributed from the center 3, a limited number of recommended store information are provided to the user as guidance sequentially from information where the time indicated with the time stamp is the closest to the current time. According to the arrangement, it is possible to preferentially provide information on a recommended store with a high possibility that it has been newly determined as a recommended store to the user with the center 3 as guidance.

Further, it may be arranged such that, by attaching a time stamp upon latest recommendation determination with respect to a recommended store to the recommended store information distributed from the center 3, a limited number of recommended store information are provided to the user as guidance sequentially from information where the time indicated with the time stamp is the closest to the current time. According to the arrangement, it is possible to preferentially provide information on a recommended store with a high possibility that it has been newly determined as a recommended store to the user with the center 3 as guidance.

According to the arrangement of the embodiment 1, the navigation device 1 automatically determines that the user has stopped over at a store based on detection of parking of the own vehicle, determines a store at which the cumulative number of stop-over times is twice as a recommended store, and automatically transmits recommended store information to the center 3. Accordingly, it is possible to perform store evaluation in a short period.

Further, as the determination of stop over at the store, and the transmission of the recommended store information to the center 3 are performed automatically, it is not necessary for the user to operate a specialized evaluation button or the like. It is possible to obtain store evaluations even from a user who dislikes labor of this operation and does not make a store evaluation.

In an arrangement requiring operation of a specialized evaluation button or the like, there is a possibility that the credibility of store evaluation is lowered. The details are as follows. When operation of a specialized evaluation button or the like is required, only evaluations by users who voluntarily perform the operation are referred to. In comparison with the users who do not voluntarily perform operation, there is a possibility that the users who voluntarily operate the button include a false customer (claque). When only evaluations from the users who voluntarily perform the operation are utilized, the ratio of evaluations by the false customers is increased, and there is fear that the credibility of evaluation is lowered.

On the other hand, according to the arrangement of the embodiment 1, it is possible to reduce the ratio of store evaluations by false customers possibly included in the users willing to the above-described labor to make store evaluations, and it is possible to increase the credibility of store evaluation. As a result, it is possible to perform store evaluation with high credibility in shorter period and to provide guidance to the user.

Figure 7:
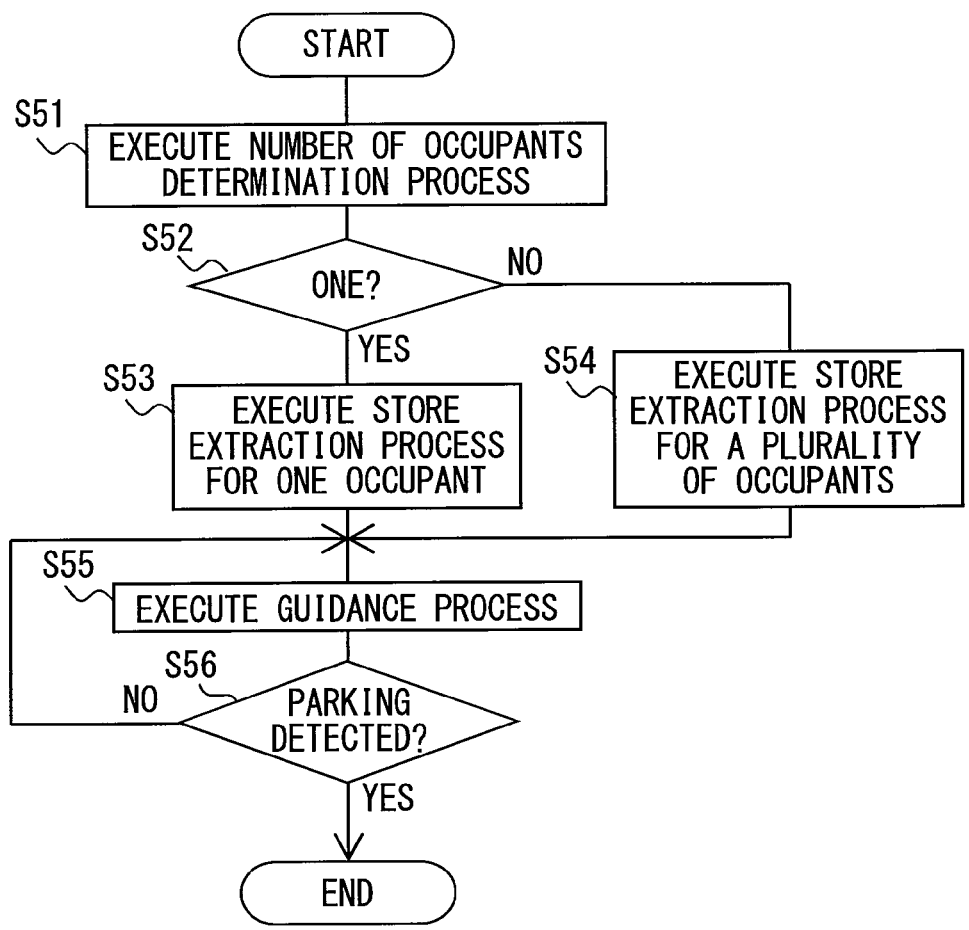
FIG. 7 is a flowchart showing an example of a flow of processing of changing a recommended store to be guided in correspondence with result of determination as to whether single or a plurality of occupants are riding in an own vehicle.

Note that it may be arranged such that a recommended store to be informed as guidance is changed in accordance with the result of determination as to whether single or a plurality of occupants are riding in the own vehicle (hereinbelow, modification 3). Next, the flow of processing in the control unit 25 to change a recommended store to be informed as guidance in accordance with the result of determination as to whether single or a plurality of occupants are riding in the own vehicle will be described using the flowchart of FIG. 7. The flow in FIG. 7 is started every time when e.g. the ignition power source of the own vehicle is turned ON.

First, at step S51, number of occupants determination processing is performed, and the process proceeds to step S52. In the number of occupants determination processing, when seating on an assistant driver's seat is detected with a seating sensor provided in the assistant driver's seat, it is determined that there are a plurality of occupants. On the other hand, when the seating on the assistant driver's seat is not detected with the seating sensor provided in the assistant driver's seat, it is determined that there is one occupant. This processing is performed by utilizing the fact that when an occupant other than the driver rides in, there is a low possibility that the occupant avoids the assistant driver's seat.

Note that it may be arranged such that the seating sensor is provided in rear seat in addition to the assistant driver's seat, and it is determined as to whether single or a plurality of occupants are riding in the own vehicle. Accordingly, the processing at step S511 corresponds to the number of occupants determination device.

At step S52, when it is determined that a single occupant is riding in the number of occupants determination processing (YES at step S52), the process proceeds to step S53. On the other hand, when it is determined that a plurality of occupants are riding in the own vehicle in the number of occupants determination processing (NO at step S52), the process proceeds to step S54.

At step S53, store extraction processing for one occupant is performed, and the process proceeds to step S55. In the store extraction processing for one occupant, among the recommended stores indicated with the recommended store information distributed from the center 3, a store having a POI property corresponding to a store to which one user visits is extracted.

At step S54, store extraction processing for a plurality of occupants is performed, and the process proceeds to step S55. In the store extraction processing for a plurality of occupants, among the recommended stores indicated with the recommended store information distributed from the center 3, a store having a POI properties corresponding to a store at which a plurality of users visit is extracted.

At step S55, the guidance processing is performed on the stores extracted in the store extraction processing for one occupant and the store extraction processing for a plurality of occupants, as in the case of the above-described recommended store guidance processing, and the process proceeds to step S56. At step S56, as in the case of the above-described step S1, when parking of the own vehicle is detected (YES at step S56), the flow ends. On the other hand, when parking of the own vehicle is not detected (NO at step S56), the process returns to step S55 to repeat the flow.

According to the arrangement of the modification 3, it is possible to provide guidance of recommended store(s) in correspondence with the number of occupants of the own vehicle to the user, and the convenience for the user is further improved.

Note that in the present embodiment, guidance of recommended store(s) is provided to the user with the navigation device 1, however, the present disclosure is not limited to this arrangement. For example, it may be arranged such that the recommended store information is received from the center 3 with a laptop PC or a personal digital assistance brought outside the vehicle and guidance of the recommended store is provided to the user. The guidance to the user includes display of a recommended store, upon store search, preferentially in a high rank in the search results.

(Embodiment 2)

The present disclosure is not limited to the above-described embodiment 1, and the next embodiment 2 is also included in the technical range of the present disclosure. Hereinbelow, the embodiment 2 will be described using FIG. 8 and FIG. 9. Note that for the sake of convenience of explanation, elements having the same functions as those of the elements shown in the figures used in the explanation of the above-described embodiment have the same reference numerals, and the explanations of those elements will be omitted.

The automatic evaluation system 100 according to the embodiment 2 is similar to the automatic evaluation system 100 according to the embodiment 1 except that the system performs processing corresponding to the processing at the above-described step S38 to step S41 on the navigation device 1 side in place of the processing at the above-described step S38 to step S41 on the center 3 side.

Figure 8:
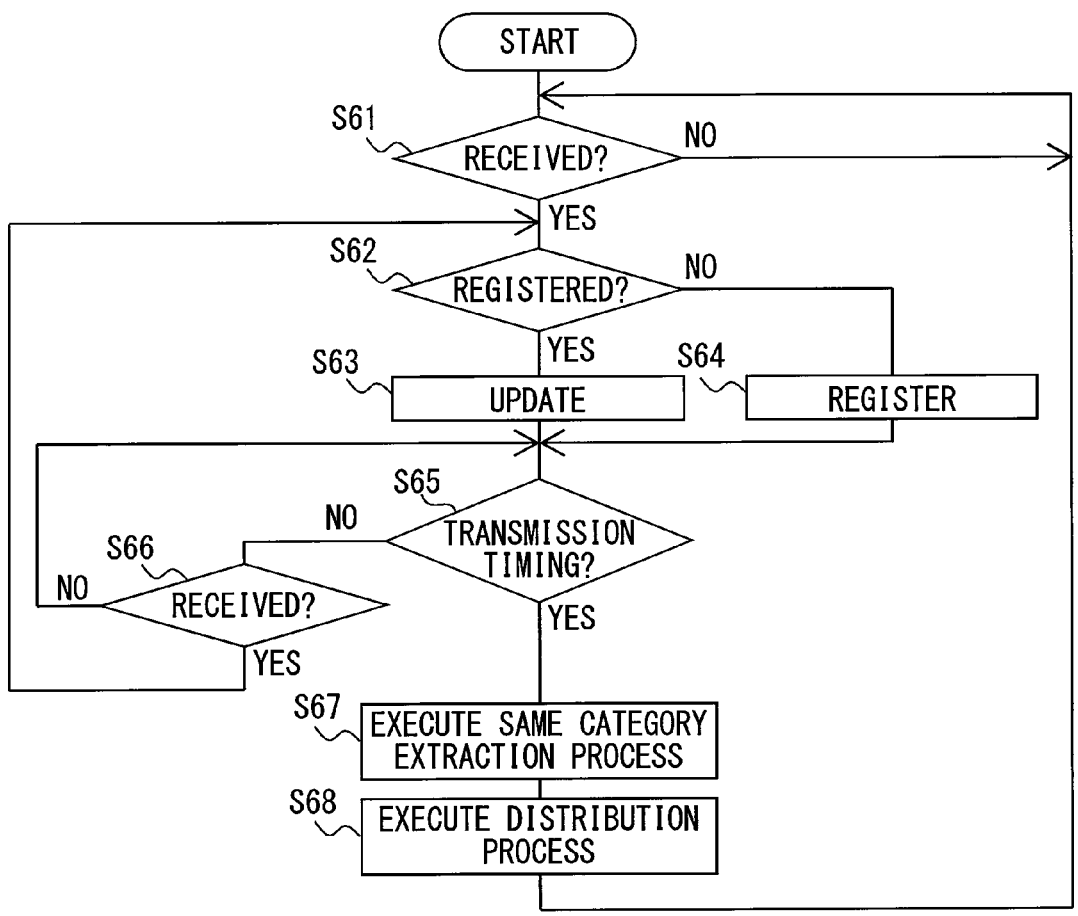
FIG. 8 is a flowchart showing an example of a flow of processing related to distribution processing in the center in an embodiment 2.

Next, processing related to the distribution processing in the center 3 in the embodiment 2 will be described using the flowchart of FIG. 8. The flow in FIG. 8 is also started when e.g. the power source of the server in the center 3 is turned ON.

Since the processing at step S61 to step S67 are identical to the processing at the above-described step S31 to step S37, the explanations of the processing will be omitted.

At step S68, the distribution processing is performed, and the process returns to step S61 to repeat the flow. In the distribution processing at step S68, the recommended store information and the not-recommended store information extracted in the same category extraction processing are distributed via the communication section 31 to the navigation device 1 of the sender source of the information distribution request. Accordingly, the step S68 also corresponds to the distribution device.

The recommended store information distributed in the distribution processing at step S68 is e.g. information indicative of a recommended store and position coordinates of the store. Further, it may be arranged such that the name of the store, the address of the store and the like are included. Further, the not-recommended store information distributed in the distribution processing at step S68 is e.g. information indicative of a not-recommended store and the position coordinates of the store. Further, the name of the store, the address of the store and the like are included.

Figure 9:
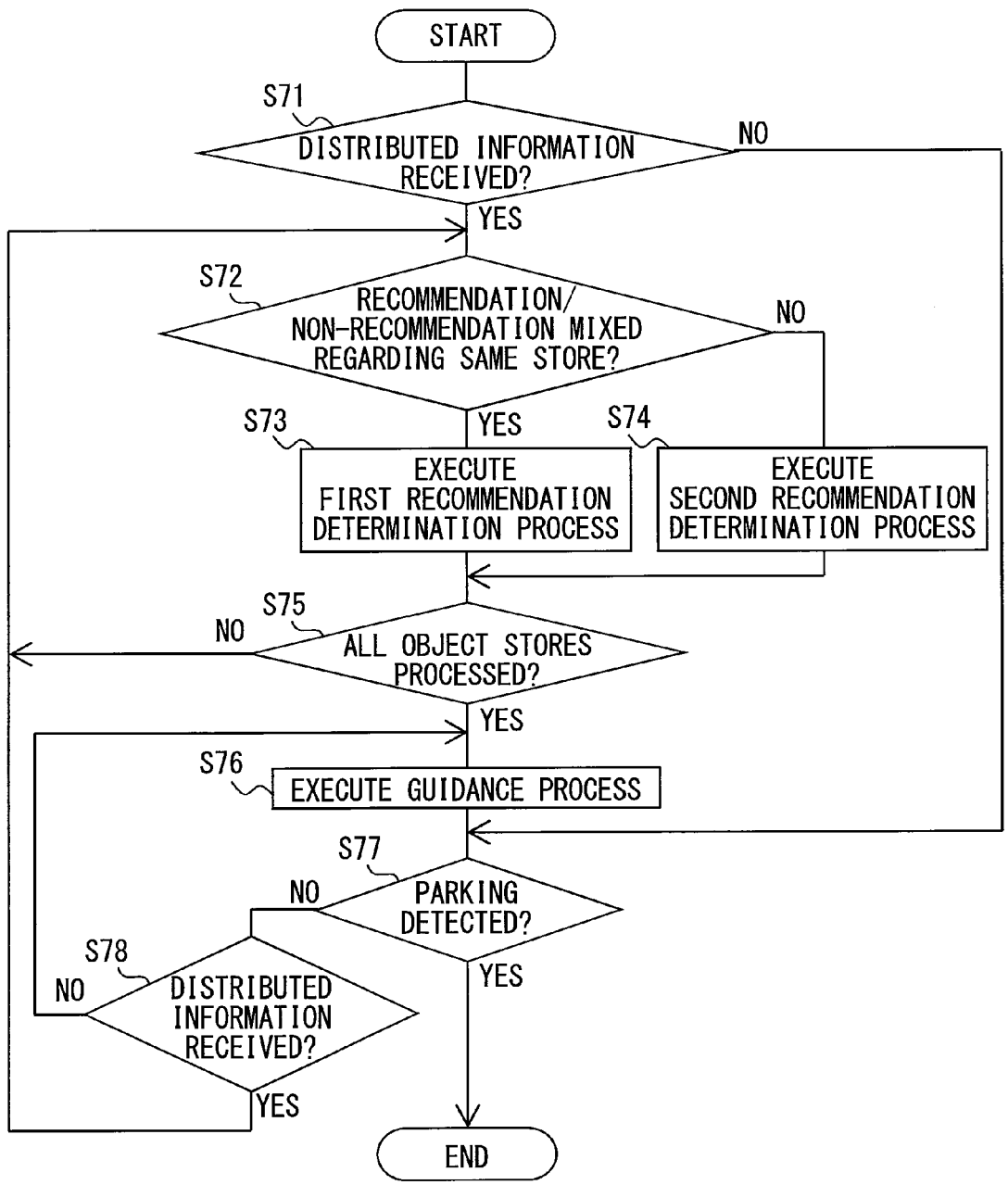
FIG. 9 is a flowchart showing an example of a flow of processing related to guidance processing in the control unit in the embodiment 2.

Next, processing related to the guidance processing in the control unit 25 in the embodiment 2 will be described using the flowchart of FIG. 9. The flow in FIG. 9 is started every time when e.g. the ignition power source of the own vehicle is turned ON, independently of the flow in FIG. 3.

First, at step S71, it is determined whether or not the information distributed from the center 3 in the distribution processing at step S68 (hereinbelow, distributed information) has been received. The reception of the distributed information is determined based on reception of input of the distributed information with the communication unit 24. When it is determined that the distributed information has been received (YES at step S71), the process proceeds to step S72. On the other hand, when it is determined that the distributed information has not been received (NO at step S71), the process proceeds to step S77.

At step S72, in the distributed information, regarding the same store, it is determined whether or not recommended store information and not-recommended store information mixedly exist. The case where the recommended store information and the not-recommended store information mixedly exist is a case where even regarding the same store, recommended store information is registered by one user, and not-recommended store information is registered by another user.

When it is determined that the recommended store information and the not-recommended store information mixedly exist (YES at step S72), the process proceeds to step S73. On the other hand, when it is determined that the recommended store information and the not-recommended store information do not mixedly exist (NO at step S72), the process proceeds to step S74. The processing at step S72 is sequentially performed with respect to e.g. all the stores included in the distributed information by one store.

At step S73, the first recommendation determination processing is performed, and the process proceeds to step S75. In the first recommendation determination processing at step S73, it is determined whether the store is a recommended store or a not-recommended store based on the recommended store information and the not-recommended store information regarding the same store in the distributed information. Accordingly, this step S73 corresponds to the recommendation determination device.

As an example, in the first recommendation determination processing, in the distributed information, when the ratio of the number of registrations of the not-recommended store information to the total number of registrations of the recommended store information and the not-recommended store information regarding the same store is equal to or greater than a predetermined value, it is determined that the store is a not-recommended store. On the other hand, when the ratio of the number of registrations of the not-recommended store information to the above-described total number of registrations is less than the predetermined value, it is determined that the store is a recommended store.

Note that it may be arranged such that when at least one piece of recommended store information is included in the information on the same store in the distributed information, the store is a recommended store (hereinbelow, modification 4). Further, it may be arranged such that when at least one piece of not-recommended store information is included in the information on the same store in the distributed information, the store is determined as a not-recommended store (hereinbelow, modification 5).

At step S74, the second recommendation determination processing is performed, and the process proceeds to step S75. In the second recommendation determination processing, when all the information regarding the same store in the distributed information is the recommended store information, the store is determined as a recommended store. On the other hand, when all the information regarding the same store in the distributed information is not-recommended store information, the store is determined as a not-recommended store.

At step S75, regarding all the stores included in the distributed information, i.e. regarding all the object stores, when the processing at step S72 and step S73 or processing at step S74 has been completed (YES at step S75), the process proceeds to step S76. On the other hand, when the processing has not been completed, the process returns to step S72, to repeat the processing on an unprocessed store.

At step S76, the guidance processing is performed on the store determined as a recommended store in the first recommendation determination processing and the second recommendation determination processing, as in the case of the recommended store guidance processing in the embodiment 1, and the process proceeds to step S77.

At step S77, when parking of the own vehicle is detected as in the case of the above-described step S1 (YES at step S77), the flow ends. On the other hand, when parking of the own vehicle is not detected (NO at step S77), the process proceeds to step S78.

At step S78, it is determined whether or not the distributed information has been received from the center 3. When it is determined that the distributed information has been received (YES at step S78), the process returns to step S72 to repeat the flow. On the other hand, when it is determined that the distributed information has not been received (NO at step S78), the process returns to step S76 to repeat the flow.

Even when the arrangement as shown in the embodiment 2 is adopted, it is possible to obtain an advantage that it is possible to perform evaluation on a store with high credibility in a shorter period and provide guidance of the evaluation to the user as in the case of the embodiment 1.

Further, in the above-described embodiment 1 and the embodiment 2, the processing related to the check-in processing and the posting processing is performed with the control unit 25 in the navigation device 1, however, the present disclosure is not limited to this arrangement. For example, it may be arranged such that, a part or all the processing related to the check-in processing and the posting processing is performed with the control section 32, by obtaining the parking detection position, the identification information, the category specifying information and the like necessary for the check-in processing and the posting processing with the control section 32 in the center 3, from the navigation device 1 (hereinbelow, modification 6). As processing executable with the control section 32 in the center 3, the processing at the above-described step S2 to step S9 can be given. In the case of the arrangement of the modification 6, the control section 32 corresponds to the stop-over determination device, the counting device, and the recommended store determination device.

Further, in the above-described embodiment 1 and the embodiment 2, the processing related to the distribution processing is performed with the control section 32 in the center 3, however, the present disclosure is not limited to this arrangement. For example, it may be arranged such that processing corresponding to a part of the processing related to the distribution processing is performed in the control unit 25 of the navigation device 1 (hereinbelow, modification 7). As processing executable with the control unit 25 of the navigation device 1, the processing at the above-described step S32 to step S34, the processing at the above-described steps S62 to S64, and the processing at step S67 can be given. In a case of the arrangement of the modification 7, the control unit 25 corresponds to the registration device.

Further, in the automatic evaluation system 100 in the above-described embodiment 1 and the embodiment 2, a store at which the cumulative number of stop-over times is two is determined as a recommended store, however, the present disclosure is not limited to this arrangement. For example, it may be arranged such that a store at which the cumulative number of stop-over times is n more than two is determined as a recommended store and automatically registered, and the registered recommended store information is displayed on the display device 18 (hereinbelow, modification 8).

Note that in the modification 8, the counting of the cumulative number of times, the determination and the registration of recommended store are performed with any of the control unit 25 and the control section 32 as shown in the modifications 6 and 7. Further, the information related to the recommended store here is the same as the information indicated regarding the recommended store in the above-described recommended store guidance processing. Further, it is preferable that n is a comparatively small value of several times e.g. three to five.

According to the arrangement of the modification 8, since the determination of stop over at a store and the registration of a recommended store are automatically performed, it is not necessary for the user to operate a specialized evaluation button or the like. It is possible to obtain store evaluations even from a user who dislikes labor of this operation and does not make a store evaluation. As a result, it is possible to perform store evaluation with high credibility and to provide guidance to the user.

Further, in the case of the arrangement of the modification 8, it is preferable that when a store at which the counted cumulative number of times is less than n and a predetermined or longer period has elapsed from the previous counting exists, the store is determined as a not-recommended store then is automatically registered, and the information on the registered not-recommended store is not displayed on the display device 18 (hereinbelow, modification 9).

Note that it may be arranged such that as shown in the modifications 6 and 7, the counting of the cumulative number of times, the determination of not-recommended store and the registration are performed with any of the control unit 25 and the control section 32. Accordingly, the control section 32 also corresponds to the first not-recommended store determination device. Further, the not-recommended store information here is information on a not-recommended store similar to the information indicated regarding the recommended store in the above-described recommended store guidance processing. The predetermined period is the same as the predetermined period in the explanation of the processing at step S22.

According to the arrangement of the modification 9, it is possible to determine a store, at which the user has not visited for the predetermined or longer period and there is a high possibility that the user did not like, as a not-recommended store, not to provide guidance of the store with a comparatively high possibility that the user did not like to the user.

Further, in the case of the arrangement in the modification 9, it is preferable that a store, at which the counted cumulative number of times is less than n, a predetermined or longer period has elapsed from the previous counting, and check-in has been performed by a local user, is determined as a not-recommended store and automatically registered, and information on the registered not-recommended store is not displayed on the display device 18 (hereinbelow, modification 10). In the arrangement of the modification 10, a store, at which the counted cumulative number of times is less than n, the predetermined or longer period has elapsed from the previous counting, and check-in has been performed by other user than a local user, is determined as a recommended store and registered, and information on the registered not-recommended store is displayed on the display device 18.

It is conceivable that a user such as a tourist who is not a local user cannot visit again even a store the user liked, and requires the above-described predetermined or longer period to visit the store again. In this case, when a store at which the predetermined or longer period has elapsed from a previous counting is determined as a store not-recommended store, there is a possibility that a store which the user liked is determined as a not-recommended store. According to the arrangement of the modification 10, even though regarding a store at which the predetermined or longer period has elapsed from the previous counting, when it is determined that check-in by a local user has not been performed, the store is not determined as a not-recommended store. Accordingly, it is possible to further improve the credibility of store evaluation.

Further, in the arrangements of the modification 8 and the modification 9, it is preferable that when a store at which the cumulative number of stop-over times becomes equal to or more than n within the predetermined period exists, the store is determined as a not-recommended store and automatically registered, and the information on the registered not-recommended store is not displayed on the display device 18 (modification 11). Note that as shown in the modifications 6 and 7, it may be arranged such that the determination and the registration of not-recommended store are performed with any of the control unit 25 and the control section 32. Accordingly, the control section 32 also corresponds to the second not-recommended store determination device.

According to the arrangement of the modification 11, it is possible to exclude a store which the user frequently visits within a predetermined period, such as the user's workplace, from recommended stores, and it is possible to further improve the credibility of store evaluation.

Further, it may be arranged such that above-described recommended store guidance processing and the display of recommended store information are performed with a communication terminal other than the navigation device 1 by transmitting the information to e.g. a laptop PC or a desktop PC other than the navigation device 1.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An automatic evaluation system comprising:
a navigation device used in a vehicle;
a communication unit:
a center that communicates with the navigation device of at least one vehicle using the communication unit,
wherein the navigation device includes:
  a position detector that determines a position of the vehicle;
  a stop-over determination device that automatically determines based on vehicle status information of the vehicle received from the position detector whether a user has stopped over at a store;
  a counting device that counts a cumulative number of stop-over times regarding the store, at which the stop-over determination device determines that the user has stopped over;
  a recommended store determination device that determines the store, at which the cumulative number of times counted with the counting device has become two, as a recommended store; and
  a posting device that automatically transmits information on the recommended store determined with the recommended store determination device to the center using the communication unit, wherein
the center includes a registration device that registers the information on the recommended store received from the navigation device of the at least one vehicle, in relation with the at least one vehicle as a sender source;
the navigation device further includes a first not-recommended store determination device that determines the store, at which the cumulative number of times counted with the counting device is one and a first predetermined period or longer has elapsed from a previous counting, as a not-recommended store, the posting device automatically transmits information on the not-recommended store determined with the first not-recommended store determination device to the center using the communication unit, and the registration device in the center registers the information on the not-recommended store received from the navigation device, in relation with the at least one vehicle as the sender source.

2. The automatic evaluation system according to claim 1, wherein the navigation device further includes a correspondence storage device previously holding a correspondence between a type of the store and a value of the first predetermined period, and wherein the first not-recommended store determination device refers to the correspondence and sets the first predetermined period according to the type of the store.

3. The automatic evaluation system according to claim 1, wherein the navigation device further includes an internal and external determination device that determines whether the store is disposed within a user's living area, and wherein, when the internal and external determination device determines that the store is disposed within the user's living area, the first not-recommended store determination device determines the store as the not-recommended store, and wherein, when the internal and external determined device determines that the store is not disposed within the user's living area, the first not-recommended store determination device does not determine the store as the not-recommended store.

4. The automatic evaluation system according to claim 1, wherein the navigation device further includes a second not-recommended store determination device that determines the store, at which the cumulative number of times counted with the counting device is two or more within a second predetermined period, as a not-recommended store, wherein the posting device automatically transmits information on the not-recommended store determined with the second not-recommended store determination device to the center, and wherein the registration device in the center registers the information on the not-recommended store received from the navigation device, in relation with the at least one vehicle as the sender source.

5. The automatic evaluation system according to claim 1, wherein, when the information on the recommended store and the information on the not-recommended store with regard to a same store are respectively received at different timings from a same navigation device, the registration device in the center registers the information received later.

6. The automatic evaluation system according to claim 1, wherein the center further includes a distribution device that distributes information on at least a part of recommended stores other than the recommended store indicated in the information on the recommended store received from the navigation device of the at least one vehicle of the sender source, among the recommended stores indicated in the information on the recommended store registered in the registration device, to the navigation device of the sender source, and wherein the navigation device further includes a guidance device that performs recommended store guidance based on the information on the at least the part of recommended stores distributed from the distribution device in the center.

7. The automatic evaluation system according to claim 6, wherein the center further includes a recommendation determination device that determines whether the store is the recommended store or the not-recommended store, with regard to a same store, based on the information on the recommended store and the information on the not-recommended store registered in the registration device in relation to the at least one vehicle as the sender source, and wherein the distribution device distributes the information on the at least the part of recommended stores other than the recommended store indicated in the information on the recommended store received from the navigation device of the sender source, among stores determined as recommended stores with the recommendation determination device, to the navigation device of the sender source.

8. The automatic evaluation system according to claim 7, wherein, when a ratio of registration of the information on the not-recommended store with the information on the recommended store and the information on the not-recommended store registered in the registration device, in relation to the at least one vehicle of the sender source with regard to the same store, is equal to or higher than a predetermined value, the recommendation determination device determines the store as the not-recommended store, and wherein, when the ratio is less than the predetermined value, the recommendation determination device determines the store as the recommended store.

9. The automatic evaluation system according to claim 7, wherein, when the information on the recommended store is registered, the recommendation determination device determines the store as the recommended store.

10. The automatic evaluation system according to claim 7 wherein, when the information on the not-recommended store is registered, the recommendation determination device determines the store as the not-recommended store.

11. The automatic evaluation system according to claim 6, wherein the distribution device in the center distributes the information on the recommended store and the information on the not-recommended store with regard to the at least the part of recommended stores and not-recommended stores other than the stores indicated with the information on the recommended store and the information on the not-recommended store received from the navigation device of the sender source, among the recommended stores indicated with the information on the recommended store and the not-recommended store indicated with the information on the not-recommended store registered in the registration device, to the navigation device, wherein the navigation device further includes a recommendation determination device that determines whether the store is the recommended store or the not-recommended store, based on the information on the recommended store and the information on the not-recommended store with regard to a same store, among the information on the recommended store and the information on the not-recommended store distributed from the distribution device in the center, and wherein the guidance device performs guidance of the store determined with the recommendation determination device as the recommended store.

12. The automatic evaluation system according to claim 6, wherein the positing device of the navigation device links the information on the recommended store to category specifying information for specifying a category of a user of the navigation device, and automatically transmits the information to the center, wherein the registration device in the center links the information on the recommended store received from the navigation device to the category specifying information, which is linked to the information on the recommended store, and registers the information, and wherein the distribution device in the center distributes the recommended store, which is received from the navigation device of the user belonging to a same category as the user of the navigation device of the sender source, to the navigation device of the sender source according to the category specifying information.

13. The automatic evaluation system according to claim 6, wherein the navigation device further includes:
- a store information storage device preliminary memorizing information indicative of a store visited by one person or a store visited by a plurality of persons; and
- a occupant number determination device that determines whether an occupant in the vehicle is a single passenger or a plurality of passengers, wherein, while guidance of the recommended store is performed, when the occupant number determination device determines that the occupant in the vehicle is a single passenger, the guidance device provides guidance of the store visited by one person based on the information stored in the store information storage device, and wherein, when the occupant number determination device determines that the occupant in the vehicle is a plurality of passengers, the guidance device provides guidance of the recommended store visited by a plurality of persons.

14. An automatic evaluation system comprising:
a navigation device used in a vehicle;
a position detector that determines a position of the vehicle;
a communication unit; and
a center that communicates with the navigation device of the vehicle using the communication unit,
wherein at least one of the center and the navigation device includes:
- a stop-over determination device that automatically determines whether a user has stopped over at a store, based on vehicle status information of the vehicle received from the position detector;
- a counting device that counts a cumulative number of stop-over times with regard to the store determined with the stop-over determination device as the store, at which the user has stopped over;
- a recommended store determination device that determines the store, at which the cumulative number of times counted with the counting device has become n, as a recommended store;
- a registration device that automatically registers the recommended store determined with the recommended store determination device; and
- a display device that displays information on the recommended store registered in the registration device, wherein n is an integer equal to or greater than 2;

the at least one of the center and the navigation device further includes a first not-recommended store determination device that determines the store, at which the cumulative number of times counted with the counting device is less than n and a first predetermined period or longer has elapsed from a previous counting, as a not-recommended store, the registration device automatically registers the not-recommended store determined with the first not-recommended store determination device, and the display device does not display information on the not-recommended store registered in the registration device.

15. The automatic evaluation system according to claim 14,
wherein the at least one of the center and the navigation device further includes an internal and external determination device that determines whether the store is disposed within a user's living area, wherein, when the internal and external determination device determines that the store is disposed within the user's living area, the first recommended store determination device determines the store as the not-recommended store, wherein, when the internal and external determination device determines that the store is not disposed within the user's living area, the recommended store determination device determines the store as the recommended store, wherein the registration device automatically registers the not-recommended store determined with the first not-recommended store determination device, and the recommended store determined with the recommended store determination device, and wherein the display device displays information on the recommended store registered with the registration device, but the display device does not display information on the not-recommended store.

16. The automatic evaluation system according to claim 15,
wherein the at least one of the center and the navigation device further includes a second not-recommended store determination device that determines the store, at which the cumulative number of times counted with the counting device is n or higher within a second predetermined period, as a not-recommended store, wherein the registration device automatically registers the not-recommended store determined with the second not-recommended store determination device, and wherein the display device does not display information on the not-recommended store registered with the registration device.

17. A navigation device in a vehicle used in an automatic evaluation system, the evaluation system comprising:
a communication unit; and
a center that communicates with the navigation device of at least one vehicle using the communication unit,
wherein the navigation device includes:
- a position detector that determines a position of the vehicle;
- a stop-over determination device that automatically determines based on vehicle status information of the vehicle received from the position detector whether a user has stopped over at a store;

a counting device that counts a cumulative number of stop-over times regarding the store, at which the stop-over determination device determines that the user has stopped over;

a recommended store determination device that determines the store, at which the cumulative number of times counted with the counting device has become two, as a recommended store; and a posting device that automatically transmits information on the recommended store determined with the recommended store determination device to the center using the communication unit, and wherein the center includes a registration device that registers the information on the recommended store received from the navigation device of the at least one vehicle, in relation with the at least one vehicle as a sender source the navigation device further includes a first not-recommended store determination device that determines the store, at which the cumulative number of times counted with the counting device is one and a fist predetermined period or longer has elapsed from a previous counting, as a not-recommended store, the posting device automatically transmits information on the not-recommended store determined with the first not-recommended store determination device to the center using the communication unit, and the registration device in the center registers the information on the not-recommended store received from the navigation device, in relation with the at least one vehicle as the sender source.

* * * * *